April 14, 1970     T. G. HARE     3,506,036
SINGLE HANDLE FAUCET VALVE
Filed July 10, 1967     4 Sheets-Sheet 1
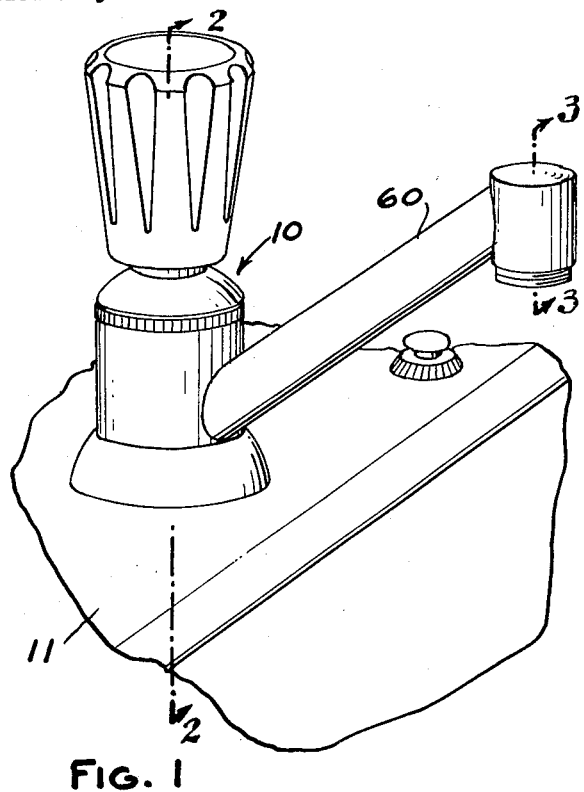
FIG. 1
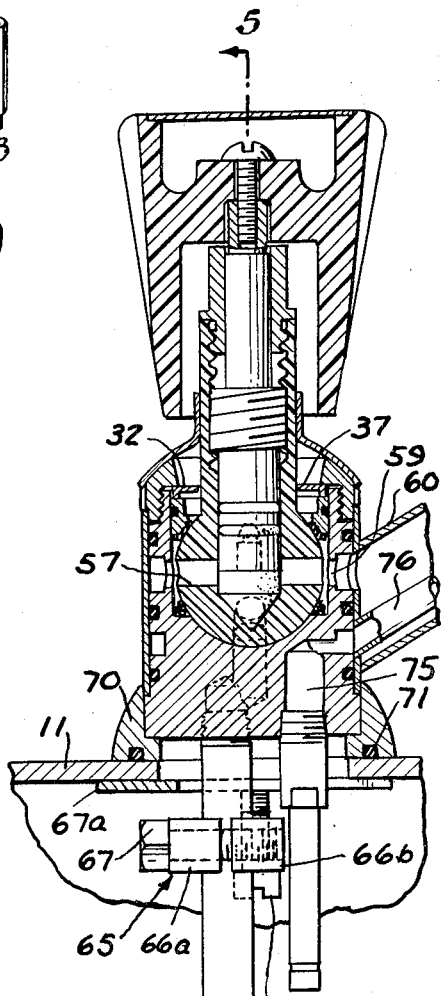
FIG. 2
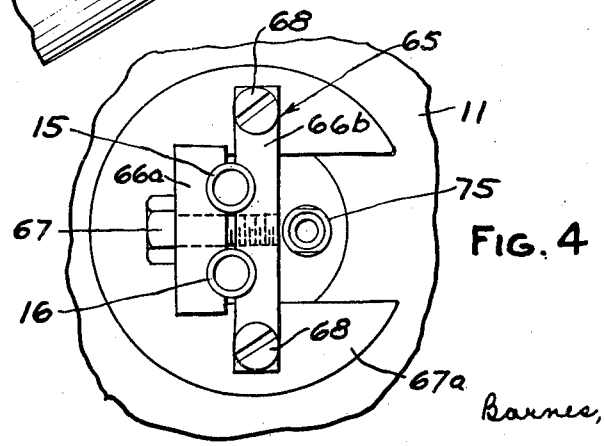
FIG. 3
FIG. 4
INVENTOR
TERENCE G. HARE
BY
Barnes, Kisselle, Raisch & Choate
ATTORNEYS April 14, 1970  T. G. HARE  3,506,036
SINGLE HANDLE FAUCET VALVE
Filed July 10, 1967  4 Sheets-Sheet 2

INVENTOR
TERENCE G. HARE
BY
Barnes, Kisselle, Raisch & Choate
ATTORNEYS

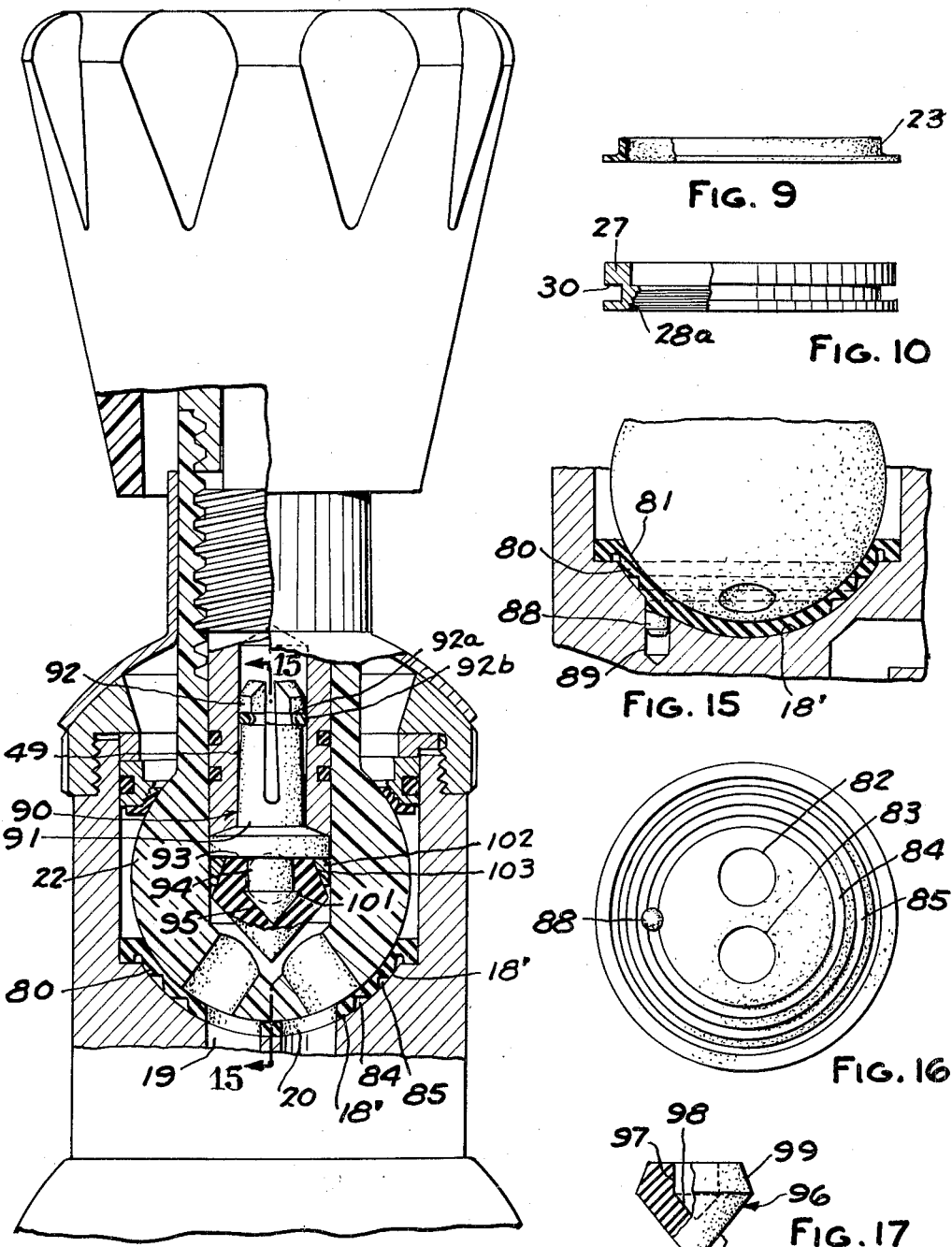

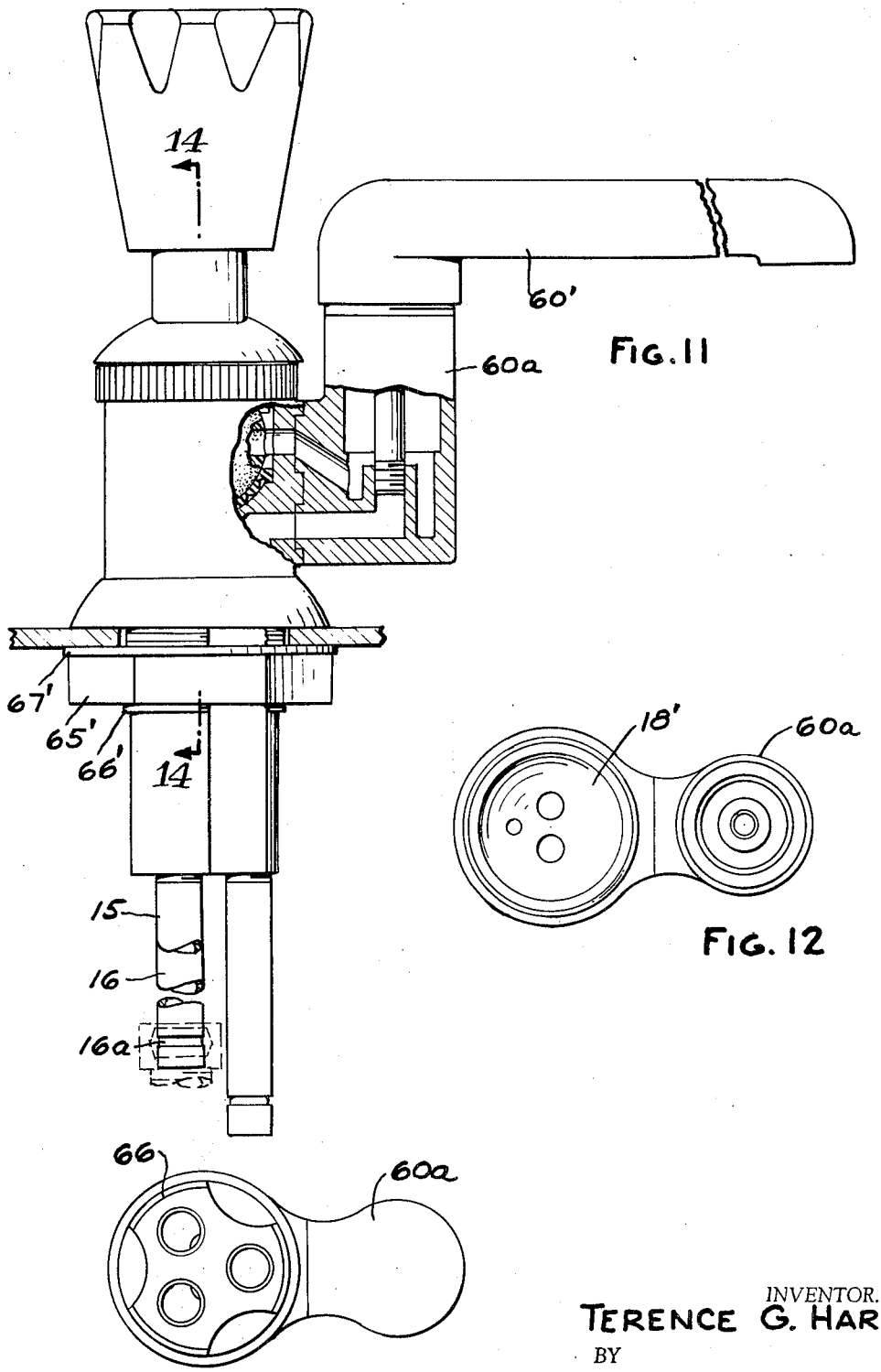

United States Patent Office 3,506,036
Patented Apr. 14, 1970

3,506,036
SINGLE HANDLE FAUCET VALVE
Terence G. Hare, Union Lake, Mich., assignor to Miller Manufacturing Company, Southfield, Mich., a corporation of Michigan
Filed July 10, 1967, Ser. No. 652,051
Int. Cl. F16k 11/02, 19/00, 25/00
U.S. Cl. 137—636.3                     14 Claims

ABSTRACT OF THE DISCLOSURE

The single handle faucet disclosed herein comprises a faucet body which has a pair of inlets for hot and cold water and a liquid outlet. A valve body is mounted for swinging movement in a single plane within the body and has a spherical surface that is complementary to a similar spherical surface on the faucet body. The valve body has a valve seat therein and passages extend from the spherical surface of the valve body to the valve seat. A valve stem is mounted within the valve body and supports a bib which is movable toward and away from the valve seat. Seals are provided on the valve. In one form of the invention the seals comprise spaced annular sealing members between the valve body and the faucet body. In another form of the invention the seals comprise a first annular sealing member and a spherical seal member interposed between the spherical surfaces of the valve and and valve body.

BACKGROUND OF THE INVENTION

In the faucet art it is common to have what is known as a single handle faucet wherein manipulation of a single handle controls both the degree of mixture of hot and cold water as well as the volume of water which is emitted.

Among the objects of the invention are to provide a single handle faucet which is simple in construction, has relatively few parts, is low in cost, can be readily serviced, will operate efficiently for long periods of time, can be easily adjusted to provide water-tight seals, which can be easily assembled without the use of special tools and which has novel seals which are not subjected to undue wear due to movement of apertures or orifices across the seal and which do not have metal-to-metal or plastic-to-metal contact thereby obviating the problems inherent in metal-to-metal or plastic-to-metal contact.

SUMMARY

The single handle faucet disclosed herein comprises a faucet body which has a pair of inlets for hot and cold water and a liquid outlet. A valve body is mounted for swinging movement in a single plane within the body and has a spherical surface that is complementary to a similar spherical surface on the faucet body. The valve body has a valve seat therein and passages extend from the spherical surface of the valve body to the valve seat. A valve stem is mounted within the valve body and supports a bib which is movable toward and away from the valve seat. Seals are provided on the valve. In one form of the invention they comprise spaced annular sealing members between the valve body and faucet body. In another form of the invention the seals comprise a first annular sealing member and a spherical seal member interposed between the spherical surface of the valve and valve body.

DESCRIPTION OF THE DRAWINGS

FIG. 1 is a fragmentary perspective view of a faucet embodying the invention.

FIG. 2 is a fragmentary sectional view taken along the line 2—2 in FIG. 1.

FIG. 3 is a fragmentary sectional view taken along the line 3—3 in FIG. 1.

FIG. 4 is a fragmentary view taken in the direction of the arrow 4 in FIG. 2.

FIG. 9 is a part sectional view of another part.

FIG. 10 is a part sectional view of another part.

FIG. 11 is a fragmentary sectional view of a modified form of faucet.

FIG. 12 is a fragmentary plan view of a portion of the faucet shown in FIG. 11.

FIG. 13 is a bottom plan view of a portion shown in FIG. 12.

FIG. 14 is a fragmentary sectional view taken along the line 14—14 in FIG. 11.

FIG. 15 is a fragmentary sectional view taken along the line 15—15 in FIG. 14.

FIG. 16 is a bottom plan view of a portion of a seal utilized in this form of the faucet valve.

FIG. 17 is a fragmentary sectional view of another portion of the faucet valve.

DESCRIPTION

Figure 5:
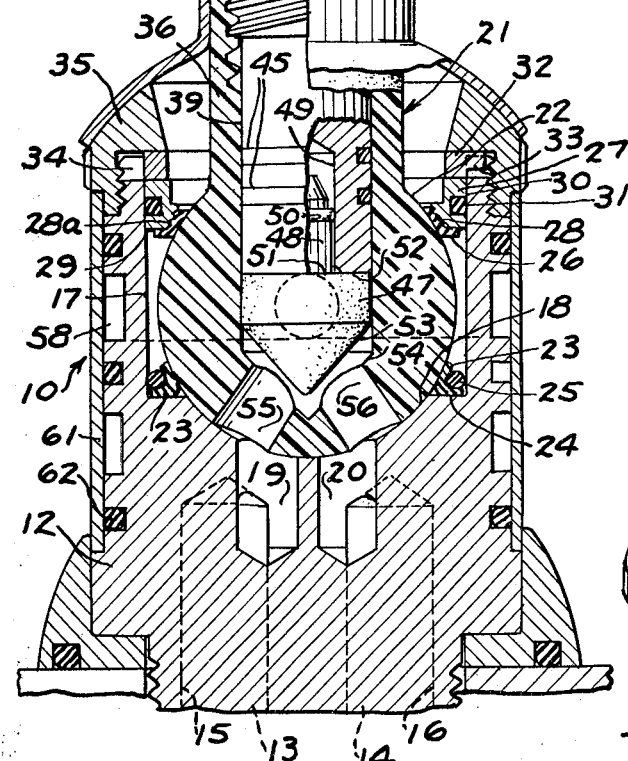
FIG. 5 is a fragmentary sectional view taken along the line 5—5 in FIG. 2, showing the parts in a different operative position.

Referring to FIGS. 1 and 2, the faucet 10 is adapted to be mounted on a sink 11 or the like, as presently described. As shown in FIGS. 2, 4 and 5, the faucet 10 comprises a faucet body 12 which has a generally cylindrical exterior surface and spaced vertical inlets 13, 14 in the lower end thereof into which pipes 15, 16 are threaded. Body 12 is formed with a cylindrical cavity 17 that has an open upper end. The lower wall of the cavity is formed with a spherical seat 18. Passages 13, 14 communicate through passageways 19, 20 with the spherical seat 18. A valve body 21 which has a spherical lower end 22 extends into the cavity 17 with the spherical surface thereof engaging the spherical seat 18.

An annular seal 23 which has a generally right angle cross section in the untensioned state, as shown in FIG. 9, is provided adjacent the lower end of the spherical portion 22 on a ledge or shoulder 24 in the base of the cavity 17 and surrounding the spherical seat 18. An O-ring 25 is provided around the seal 23 and serves to resiliently back up the vertical leg of the seal. A second seal 26 similar to seal 23 which has a generally obtuse cross section in the untensioned state is provided along the upper surface of the spherical member 22 and is urged into sealing contact therewith by a collar 27 that extends into the cylindrical cavity 17 and has surfaces 28, 29 that extend upwardly and inwardly and horizontally, respectively, to engage the legs of the seal 26 and urge the inclined leg against the surface of the spherical member 22. The surface 28 of collar 27 which engages the seal 26 has annular ribs 28a thereon which firmly grip the seal 26 and urge it against the spherical surface of the valve body 21. The collar 27 is formed with an annular groove 30 in which an O-ring 31 is seated to provide a seal between the seal collar 27 and the wall of the cavity 17.

Figure 7:
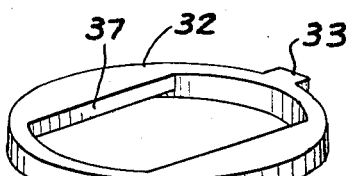
FIG. 7 is a perspective view of one of the parts.
Figure 8:
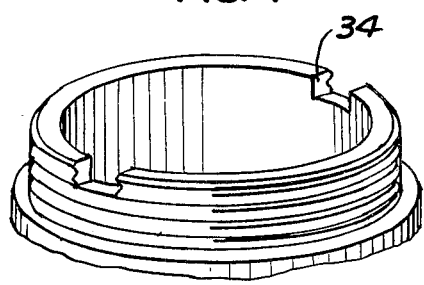
FIG. 8 is a fragmentary perspective view of another of the parts.

A guide ring 32 (FIG. 7) extends within the cavity 17 over the seal collar 27 and has a radially extending tab 33 which engages a complementary cut-out portion 34 in the upper end of the valve body 12 (FIG. 8). A faucet nut 35 is threaded on the upper end of the valve body 12 and holds the guide ring 32 and, in turn, the seal collar 27 in position to, in turn, cause the seals 26 and 27 to engage the surface of the spherical portion 22 of the valve body 21.

The valve 21 includes a generally cylindrical portion 36 with two flat sides 36a that extends upwardly through an elongated opening 37 in the guide ring 32. The width of the flat portion 36 is substantially equal to the width of the opening 37 so that the valve 21 is limited in its movement by guide ring 32 so that it will move only in a single plane, as presently described.

The seals 23, 26 are preferably made of a low friction material which is resistant to hot water and is dimensionally stable. A satisfactory material comprises Teflon. The valve 21 is also preferably made of a low friction dimensionally stable material that is resistant to hot water and is different from material of seals 23, 26. A satisfactory material comprises polyphenylene oxide such as made by General Electric Company, Pittsfield, Mass., and sold under the trademark PPO, grade C-1001.

A valve stem 38 extends downwardly within an opening 39 in the valve body 21 and has an intermediate threaded portion 40 which engages threads 41 in the side of the opening 39. A handle or knob 42 has serrations thereon engaging complementary serration 43 on the upper end of the stem 38. A screw 44 is threaded through an opening in the upper end of the knob 42 into the upper end of the stem 38. By rotating the knob 42, the stem 38 is translated radially inwardly and outwardly with respect to the valve body 21 within the opening 39. The stem is provided with longitudinally spaced O-rings 45 that extend in grooves in the stem and engage the sides of the opening 39.

A bib seal 47 is provided on the lower end of the stem 38. Bib seal is preferably made of a low friction stable material such as the material of which the valve body 21 is made. The bib seal 47 comprises an upper portion 48 that extends into a cavity 49 in the stem. The upper portion has an O-ring 50 in a groove therein frictionally engaging the sides of the opening 49 to retain the bib seal within the stem. The bib seal 47 also includes a shoulder 51 that engages the flat end 52 of the stem. The lower end of the bib 47 is enlarged but turns freely in the opening 39 and has a conical surface 53 which is adapted to engage a complementary surface 54 at the base of the opening 39. Generally radial openings 55, 56 extend from the periphery of the spherical portion 22 to the conical surface 54.

When the valve body 21 is in the position shown in FIG. 5, communication is provided to inlets 13, 14, passageways 19, 20 to the openings 55, 56 and, in turn, the opening 39. If the bib seal 47 is in raised position as shown in FIG. 5, water will flow freely into the opening 39 below the stem. The spherical portion 22 includes a diametrically extending opening 57 which communicates with the opening 39 permitting water to flow outwardly to an annular groove 58 in the valve body 12. The water can then flow outwardly through an opening 59 to spout 60. Spout 60 is supported rotatably on the valve body 12 by a cylindrical wall 61. O-rings 62 provide a seal between the valve body 12 and the cylindrical wall 61.

Figure 6:
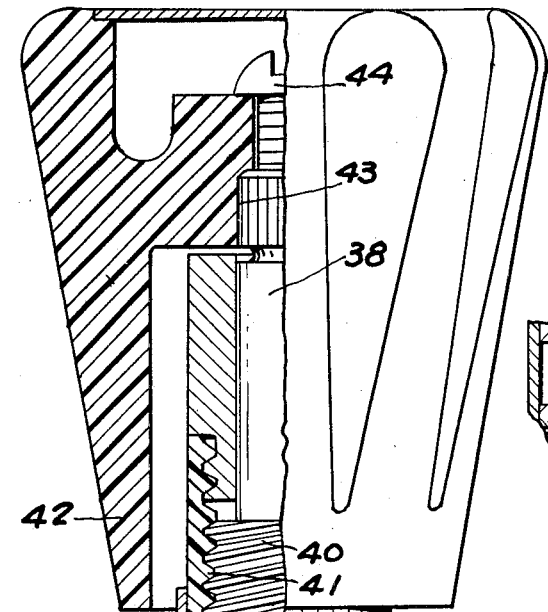
FIG. 6 is a fragmentary sectional view similar to FIG. 5, showing the parts in a still further operative position.
Figure 6:
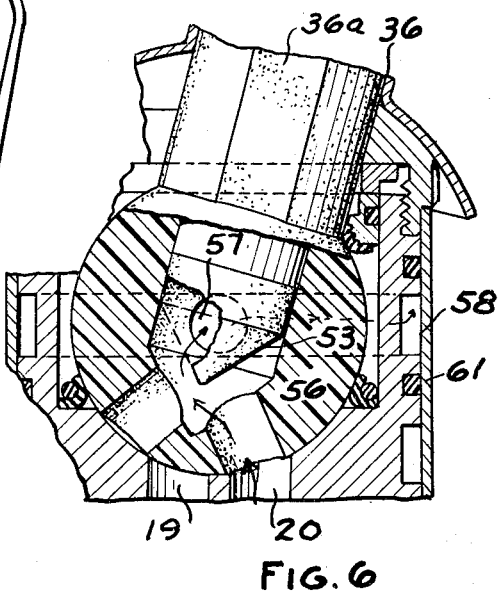

By swinging the stem 38 and, in turn, the valve body 21, the degree of registry of the openings 55, 56 relative to the passageways 19, 20 may be controlled. Thus, as shown in FIG. 6, in one position only opening 56 is in register with passageway 20 permitting water to flow only from one of the passageways 19, 20. Thus, if hot and cold water are provided respectively to the passageways 19, 20 by swinging the valve stem 38, the degree of hot, cold or mixture of hot and cold can be controlled.

By threading the stem downwardly, the conical surface 53 may be brought into registry with the conical surface 54 to close off and thereby prevent flow out of the openings 55, 56.

In order to mount the faucet on the sink 11, a mounting clamp 65 is utilized as shown in FIGS. 2 and 4. The clamp 65 is made of two blocks 66a, 66b which are clamped about the inlet pipes 15, 16 and by tightening a bolt 67 that is threaded therein. Screws 68 are threaded upwardly through the blocks and are adapted to engage a plate 67a on the underside of the sink to hold the faucet in position. The pipes 15, 16 are preferably made of rigid material. It can thus be seen that by this arrangement, the faucet can be readily mounted on the sink. A mounting collar 70 is provided on the lower end of the faucet and is adapted to engage the top surface of the sink 11. An O-ring 71 is positioned within an annular recess in the mounting collar 70. Each of the pipes 15, 16 is provided with a peripheral groove 16a which is adapted to receive a standard compression fitting as well as withstand water pressure and water hammer.

As shown in FIG. 2, a return passageway 75 is provided in the body and communicates with a tube 76 for returning liquid from the spout to a rinse mechanism in the end of the spout 60, in accordance with well-known construction.

In the form of the invention shown in FIGS. 11–17, the single handle faucet is of substantially the same construction as in the previous form of the invention and for purposes of clarity identical reference numerals are used for identical parts. In this form, the valve body has an interconnecting bracket 60a thereon on which the spout 60' is pivotably mounted.

In this form, the seal between spherical end 22 of valve body 21 and the faucet body 12 is provided by a member 80 that is generally spherical. Member 80 is made of synthetic rubber such as buna-N and has an inner accurately formed surface defined by a layer 81 of trifluorethylene such as Teflon. Member 80 includes openings 82, 83 which are aligned with the openings 19, 20. In addition, member 80 includes concentric grooves 84, 85 surrounding openings 82, 83 that engage the spherical surface 18' of the faucet body 12. In order to prevent rotation between the member 80 and the body 12 and thereby maintain the openings 82, 83 in alignment with the openings 19, 20, an integral projection 88 extends axially into a complementary opening 89 in the faucet body 12.

When the collar 35 is tightened downwardly by hand, the spherical portion 22 of the valve body is urged against the Teflon layer 81 and compresses the member 80 slightly to provide a seal between the spherical surface of the valve body 22 and the member 80, without the use of a wrench.

In addition in this form of the invention, the bib seal is replaced with a seal 90 made of low friction material such as the material of the valve body 21 which comprises a single cylindrical portion 91 of substantially the same diameter as the opening 49 and an upper bifurcated portion 92 that has enlarged portions at its upper end. Each bifurcated portion 92 is provided with a groove 92a on its outer periphery spaced from the upper end and a split metal ring 92b is sprung over the bifurcated ends 92. The ring 92b has an outer diameter greater than the diameter of the opening 49 so that it frictionally and non-rotatably engages the opening. This holds the seal 90 within the opening 49 and prevents axial movement of the seal 90. However, the seal 90 is free to rotate relative to the ring 92b in order to minimize wear. The upper enlarged ends of the bifurcated portion 92 when in the untensioned state define a diameter that is larger than the diameter of opening 49.

The lower end of the seal 90 is formed with a flange 93 that engages the lower end of the valve stem. The lower end 93 has its bottom formed with an annular groove 94 and an axially extending conical projection 95. A sealing member or bib seal 96 of rubber is frictionally held on the lower end of the seal 90 and includes an axial opening 97 having a conical bottom 98 and an outer tapered portion 99 and conical surface 100. The projection 95 is formed with a shoulder 101 that frictionally engages the opening in the sealing member 96. An uninterrupted ring 102 having a tapered inner surface 103 is provided adjacent the surface 99 of the sealing member 96 to retain the sealing member on the projection 95. The sealing member 96 and ring 102 are first brought together and then applied to the projection 95 as a unit by forcing upwardly on the projection. In this form of the invention, the faucet is mounted on the sink by an arrangement which includes a nut 65' threaded on intermediate portion 66' of the valve body against a washer 67' on the underside of the sink 11.

I claim:

1. In a single handle faucet, the combination comprising:
a faucet body,
said faucet body having a pair of liquid inlets for hot and cold water and a liquid outlet,
said faucet body having a substantially spherical surface and passages extending from said inlets to said spherical surface within said body,
a valve body mounted for swinging movement in a single plane within said faucet body,
said valve body having a spherical surface complementary to said spherical surface on said faucet body,
said valve body having a valve seat therein and passage means extending from said spherical surface of said valve body to said valve seat,
a valve stem mounted within said valve body for movement toward and away from said valve seat,
a bib seal on said valve stem adapted to engage said valve seat,
said valve stem having a portion thereof extending exteriorly of said body for manual manipulation of said stem,
means for guiding said valve body to selectively change the communication of the passages in the valve body with the inlets of said faucet body,
a member having an axial projection,
said valve stem having an opening into which said projection extends,
said projection having a bifurcated upper end,
said upper end having a groove spaced from the end thereof,
a ring in said groove engaging the sides of said opening,
said ring being thereby non-rotatably mounted in said opening and retaining said member in said opening,
said member being made of low friction material whereby it is rotatable relative to said ring,
said bib seal comprising a resilient member mounted on the lower end of said last mentioned member.

2. The combination set forth in claim 1 wherein said resilient member has a tapered conical lower end and a frusto-conical portion tapering inwardly and upwardly from said lower end portion,
and a ring surrounding said frusto-conical portion and retaining said resilient member on the member having the axial projection.

3. The combination set forth in claim 1 wherein the outer diameter of the bifurcated upper end of the projection in the untensioned state is greater than the diameter of said opening.

4. In a single handle faucet, the combination comprising:
a faucet body,
said faucet body having a pair of liquid inlets for hot and cold water and a liquid outlet,
said faucet body having a substantially spherical surface and passages extending from said inlets to said spherical surface within said body,
a valve body mounted for swinging movement in a single plane within said faucet body,
said valve body having a spherical surface complementary to said spherical surface on said faucet body,
said valve body having a valve seat therein and passage means extending from said spherical surface of said valve body to said valve seat,
a valve stem mounted within said valve body for movement toward and away from said valve seat,
a bib seal on said valve stem adapted to engage said valve seat.
said valve stem having a portion thereof extending exteriorly of said body for manual manipulation of said stem,
means for guiding said valve body to selectively change the communication of the passages in the valve body with the inlets of said faucet body,
seals between said valve body and said faucet body,
said seals comprising an annular sealing member adjacent the upper end of the spherical surface of said valve body,
means interposed between said faucet body and said seal member for urging said sealing member against said valve body,
and another resilient sealing member comprising a spherical sealing member interposed between the spherical surface of said valve body and the substantially spherical surface of said faucet body,
said spherical sealing member having spaced openings therethrough aligned with the passages in said faucet body.

5. The combination set forth in claim 4 including a layer of dimensionally stable low friction plastic materal on the surface of said spherical seal member which is contacted by the spherical surface of the valve body.

6. The combination set forth in claim 4 including annular serrations in the surface of said spherical seal member which contacts the faucet body,
said serrations surrounding the passages which extend to the spherical surface of the faucet body.

7. The combination set forth in claim 4 wherein said passage means in said valve body comprise a bifurcated passage extending from the valve seat to the spherical surface of the valve body.

8. In a single handle faucet, the combination comprising:
a faucet body,
said faucet body having a pair of liquid inlets for hot and cold water and a liquid outlet,
said faucet body having a substantially spherical surface and passages extending from said inlets to said spherical surface within said body,
a valve body mounted for swinging movement in a single plane within said faucet body,
said valve body having a spherical surface complementary to said spherical surface on said faucet body,
said valve body having a valve seat therein and passage means extending from said spherical surface of said valve body to said valve seat,
a valve stem mounted within said valve body for movement toward and away from said valve seat,
a bib seal on said valve stem adapted to engage said valve seat,
said valve stem having a portion thereof extending exteriorly of said body for manual manipulation of said stem,
and means for guiding said valve body to selectively change the communication of the passages in the valve body with the inlets of said faucet body,
spaced seals between said valve body and said faucet body,
one of said seals comprising an annular flexible ring of dimensionally stable low friction plastic material and means interposed between said ring and said faucet body for urging said ring against said spherical surface of said valve body,
another of said seals comprising a pherical sealing member interposed between said spherical surfaces, said spherical sealing member having spaced openings therethrough aligned with the passages in said faucet body, said spherical sealing member being made of compressible material, said faucet body and said sealing member having interengaging means to prevent rotation therebetween, said spherical sealing member having a low friction surface which is contacted by the spherical surface of the valve body, said interengaging means comprising an axial projection on one of said sealing member and said faucet body and a complementary opening on the other of said sealing member and faucet body.

9. The combination set forth in claim 8 wherein said low friction surface on said spherical sealing member comprises a layer of dimensionally stable low friction plastic material.

10. The combination set forth in claim 8 including annular serrations in the surface of said spherical seal member which contacts the faucet body, said serrations surrounding the passages which extend to the spherical surface of the faucet body.

11. The combination set forth in claim 8 wherein said passage means in said valve body comprise a bifurcated passage extending from the valve seat to the spherical surface of the valve body.

12. In a single handle faucet, the combination comprising:

a faucet body, said faucet body having a pair of liquid inlets for hot and cold water and a liquid outlet, said faucet body having a substantially spherical surface and passages extending from said inlets to said spherical surface within said body, a valve body mounted for swinging movement in a single plane within said faucet body, said valve body having a spherical surface complementary to said spherical surface on said faucet body, said valve body having a valve seat therein and passage means extending from said spherical surface of said valve body to said valve seat, a valve stem mounted within said valve body for movement toward and away from said valve seat, a bib seal on said valve stem adapted to engage said valve seat, said valve stem having a portion thereof extending exteriorly of said body for manual manipulation of said stem, and means for guiding said valve body to selectively change the communication of the passages in the valve body with the inlets of said faucet body, spaced seals between said valve body and said faucet body, one of said seals comprising an annular flexible ring of dimensionally stable low friction plastic material and means interposed between said ring and said faucet body for urging said ring against said spherical surface of said valve body, the other of said seals comprising a resilient sealing member interposed between the spherical surface of said valve body and said faucet body and spaced from said one seal.

13. The combination set forth in claim 12 wherein the sealing member comprising the other of said seals comprises an annular flexible ring of dimensionally stable low friction plastic material and means interposed between said ring and said faucet body for yieldingly urging said ring against said spherical surface of said valve body.

14. The combination set forth in claim 13 wherein said means interposed between said second mentioned ring and said faucet body comprises an O-ring.

References Cited

UNITED STATES PATENTS

| | | | |
|---|---|---|---|
| 2,050,273 | 8/1936 | Chamberlin | 137—636.3 |
| 2,876,982 | 3/1959 | Snider | 251—88 |
| 2,923,315 | 2/1960 | Bletcher | 137—454.6 |
| 2,949,923 | 8/1960 | Clerc | 137—636.3 X |
| 3,130,750 | 4/1964 | Post | 137—636.3 |
| 3,192,943 | 7/1965 | Moen | 137—454.6 X |
| 3,239,191 | 3/1966 | Widera | 251—315 X |
| 3,250,296 | 5/1966 | Perlman | 137—636.3 X |
| 3,384,121 | 5/1968 | Spencer | 137—636.2 X |
| 3,385,560 | 5/1968 | Hare | 251—368 X |
| 3,390,701 | 7/1968 | Moen | 137—636.3 X |
| 3,395,733 | 8/1968 | Spencer | 137—636.3 |

CLARENCE R. GORDON, Primary Examiner

U.S. Cl. X.R.

137—454.6; 251—88, 368